US012466982B2

(12) United States Patent
Jiang et al.

(10) Patent No.: US 12,466,982 B2
(45) Date of Patent: Nov. 11, 2025

(54) SILICONE PRESSURE SENSITIVE ADHESIVE COMPOSITION CONTAINING A POLYFLUOROPOLYETHER SILANE ADDITIVE AND METHODS FOR THE PREPARATION AND USE OF SAID COMPOSITION

(71) Applicant: Dow Silicones Corporation, Midland, MI (US)

(72) Inventors: Jingui Jiang, Shanghai (CN); Jiayin Zhu, Shanghai (CN); Chengrong Zhu, Shanghai (CN); Zhihua Liu, Shanghai (CN); Qing Cao, Shanghai (CN); Yan Zhou, Shanghai (CN)

(73) Assignee: Dow Silicones Corporation, Midland, MI (US)

( * ) Notice: Subject to any disclaimer, the term of this patent is extended or adjusted under 35 U.S.C. 154(b) by 228 days.

(21) Appl. No.: 18/552,309

(22) PCT Filed: Jun. 16, 2021

(86) PCT No.: PCT/CN2021/100321
§ 371 (c)(1),
(2) Date: Sep. 25, 2023

(87) PCT Pub. No.: WO2022/261853
PCT Pub. Date: Dec. 22, 2022

(65) Prior Publication Data
US 2024/0174904 A1    May 30, 2024

(51) Int. Cl.
*C09J 7/38* (2018.01)
*C08G 77/08* (2006.01)
*C08G 77/12* (2006.01)
*C08G 77/20* (2006.01)
*C08K 5/5435* (2006.01)
*C09J 183/04* (2006.01)

(52) U.S. Cl.
CPC ............ *C09J 183/04* (2013.01); *C08G 77/08* (2013.01); *C08G 77/12* (2013.01); *C08G 77/20* (2013.01); *C08K 5/5435* (2013.01); *C09J 7/38* (2018.01); *C09J 2301/302* (2020.08); *C09J 2483/00* (2013.01); *Y10T 428/28* (2015.01); *Y10T 428/2852* (2015.01)

(58) Field of Classification Search
None
See application file for complete search history.

(56) References Cited

U.S. PATENT DOCUMENTS

| | | |
|---|---|---|
| 2,676,182 A | 4/1954 | Daudt et al. |
| 3,159,601 A | 12/1964 | Ashby et al. |
| 3,220,972 A | 11/1965 | Lamoreaux et al. |
| 3,284,406 A | 11/1966 | Nelson |
| 3,296,291 A | 1/1967 | Scotia et al. |
| 3,344,160 A | 9/1967 | Holbrook |
| 3,419,593 A | 12/1968 | Willing et al. |
| 4,374,967 A | 2/1983 | Brown et al. |
| 4,584,355 A | 4/1986 | Blizzard et al. |
| 4,585,836 A | 4/1986 | Homan et al. |
| 4,591,622 A | 5/1986 | Blizzard et al. |
| 4,611,042 A | 9/1986 | Rivers-Farrell et al. |
| 4,766,176 A | 8/1988 | Lee et al. |
| 4,772,515 A | 9/1988 | Hara et al. |
| 4,774,310 A | 9/1988 | Butler |
| 4,980,443 A | 12/1990 | Kendziorski et al. |
| 5,017,654 A | 5/1991 | Togashi et al. |
| 5,169,920 A | 12/1992 | Okawa |
| 5,317,072 A | 5/1994 | Bokerman et al. |
| 6,001,943 A | 12/1999 | Enami et al. |
| 6,677,407 B1 | 1/2004 | Bilgrien et al. |
| 6,806,339 B2 | 10/2004 | Cray et al. |
| 6,956,087 B2 | 10/2005 | Lai et al. |
| 8,546,508 B2 | 10/2013 | Nabeta et al. |
| 8,580,073 B2 | 11/2013 | Behl et al. |
| 9,045,647 B2 | 6/2015 | Kleyer et al. |
| 9,562,149 B2 | 2/2017 | Cray et al. |
| 9,593,209 B2 | 3/2017 | Dent et al. |
| 10,155,852 B2 | 12/2018 | Enami |
| 10,494,484 B2 | 12/2019 | Hori et al. |
| 2007/0289495 A1 | 12/2007 | Cray et al. |
| 2012/0328863 A1 | 12/2012 | Kuo |
| 2016/0376482 A1 | 12/2016 | Morgeneyer et al. |
| 2017/0233612 A1 | 8/2017 | Han et al. |

(Continued)

FOREIGN PATENT DOCUMENTS

| | | |
|---|---|---|
| EP | 0347895 | 11/1993 |
| JP | 2006181994 | 7/2006 |

(Continued)

OTHER PUBLICATIONS

Dowsil™ RMS-777 Safety Data Sheet, The Dow Chemical Company, 2014.
Syl-Off™ 4000 Catalyst Technical Data Sheet, The Dow Chemical Company.
Syl-Off™ 7028 Crosslinker Technical Data Sheet, The Dow Chemical Company, 2017.
Syl-Off™ 7048 Crosslinker Technical Data Sheet, The Dow Chemical Company, 2017.
Syl-Off™ 7672 Crosslinker Technical Data Sheet, The Dow Chemical Company, 2018.
Syl-Off™ SL 9250 Anchorage Additive Safety Data Sheet, The Dow Chemical Company, 2018.

(Continued)

*Primary Examiner* — Anish P Desai
(74) *Attorney, Agent, or Firm* — Catherine U. Brown

(57) ABSTRACT

A silicone pressure sensitive adhesive composition is curable to form a silicone pressure sensitive adhesive. The silicone pressure sensitive adhesive composition can be coated on a substrate and cured to form a topside protective film. The topside protective film can be used to protect an anti-fingerprint hard coating in a screen protective film on cover glass for a display device, such as a smartphone.

15 Claims, 1 Drawing Sheet

(56) References Cited

U.S. PATENT DOCUMENTS

| | | | |
|---|---|---|---|
| 2020/0262178 A1 | 8/2020 | Van Florcke | |
| 2021/0309899 A1 | 10/2021 | Jiang et al. | |
| 2022/0340785 A1 | 10/2022 | Jiang et al. | |

FOREIGN PATENT DOCUMENTS

| | | | |
|---|---|---|---|
| JP | 2019059203 | 4/2019 | |
| KR | 2019123079 | 10/2019 | |
| WO | 2020078780 | 4/2020 | |
| WO | 2020104316 | 5/2020 | |
| WO | 2020104317 | 5/2020 | |
| WO | 2020261910 | 12/2020 | |
| WO | 2021000279 | 1/2021 | |
| WO | 2021000280 | 1/2021 | |
| WO | WO-2022246681 A1 * | 12/2022 | ................ C09J 7/38 |
| WO | WO-2022261858 A1 * | 12/2022 | ............ C09J 183/04 |

* cited by examiner

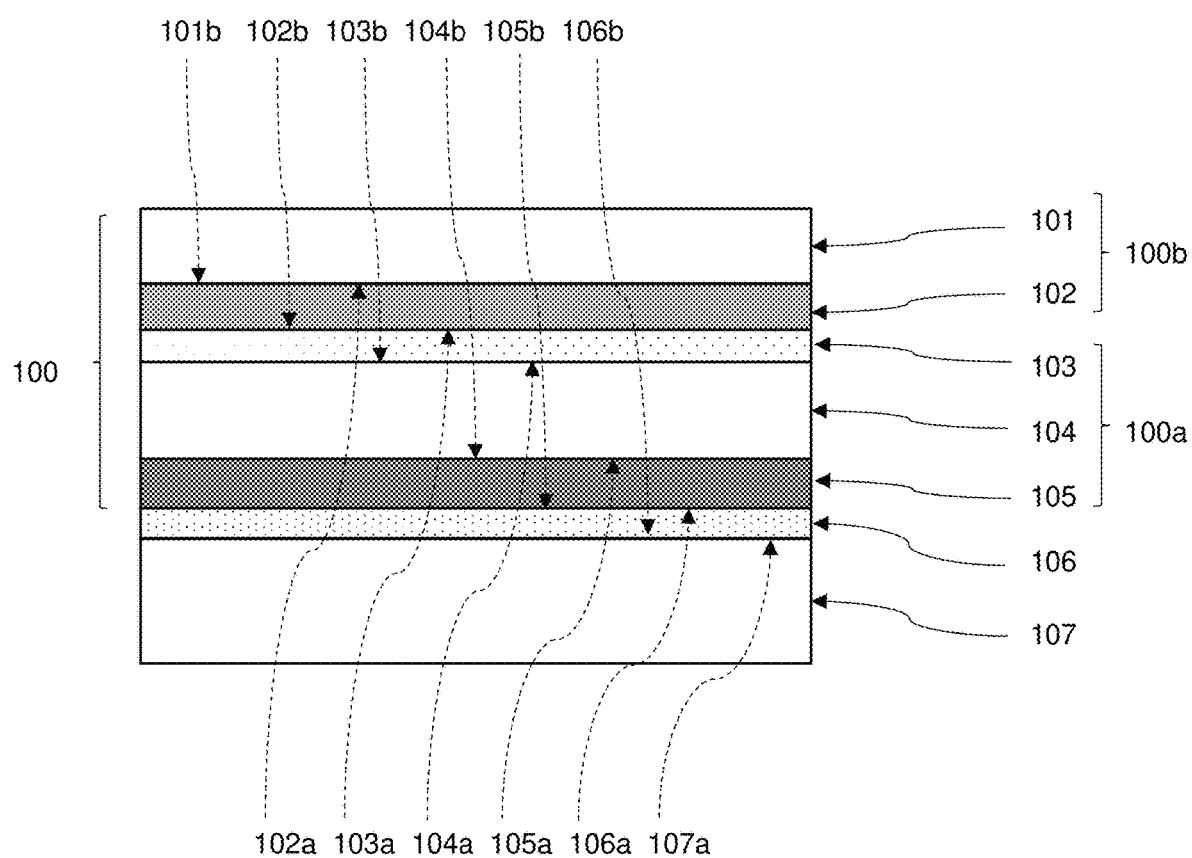

SILICONE PRESSURE SENSITIVE ADHESIVE COMPOSITION CONTAINING A POLYFLUOROPOLYETHER SILANE ADDITIVE AND METHODS FOR THE PREPARATION AND USE OF SAID COMPOSITION

CROSS REFERENCE TO RELATED APPLICATIONS

This application is a U.S. national stage filing under 35 U.S.C. § 371 of PCT Application No. PCT/CN2021/100321 filed on 16 Jun. 2021, currently pending. PCT Application No. PCT/CN2021/100321 is hereby incorporated by reference.

TECHNICAL FIELD

A silicone pressure sensitive adhesive composition can be cured on a substrate to form a topside protective film. The topside protective film is useful in electronics applications for protection of an anti-fingerprint hard coating layer in a screen protective film on a display glass.

BACKGROUND

Protective films can be used during fabrication and shipping of display devices, such as mobile phones and tablets. A topside protective film that adheres to an anti-fingerprint hard coating used in a display device, in order to protect cover glass from scratches and other damage during processing and/or shipping is desired. However, it is further desired that the topside protective cleanly release from the anti-fingerprint hard coating, e.g., without leaving residue discernable to an end user of the display device.

SUMMARY

A silicone pressure sensitive adhesive (Si-PSA) composition and method for its preparation are disclosed. The Si-PSA composition is curable to form a Si-PSA on various substrates. A topside protective film comprising the Si-PSA on a surface of a substrate may be used on an anti-fingerprint hard coating of a screen protective film on a cover glass useful in a display device.

BRIEF DESCRIPTION OF THE DRAWINGS

FIG. 1 shows a partial cross section of a protective film used on an anti-fingerprint coating on a cover glass, which is suitable for use in a display device.

| Reference Numerals | |
|---|---|
| 100 | protective film |
| 100a | screen protective film |
| 100b | topside protective film |
| 101 | polymeric substrate |
| 101b | surface of polymeric substrate 101 |
| 102 | topside Si-PSA |
| 102a | surface of topside Si-PSA 102 |
| 102b | opposing surface of topside Si-PSA 102 |
| 103 | anti-fingerprint hard coating |
| 103a | surface of AF hard coating 103 |
| 103b | opposing surface of AF hard coating 103 |
| 104 | substrate |
| 104a | surface of substrate 104 |
| 104b | opposing surface of substrate 104 |

| Reference Numerals | |
|---|---|
| 105 | Si-PSA |
| 105a | surface of Si-PSA 105 |
| 105b | opposing surface of Si-PSA 105 |
| 106 | anti-fingerprint coating |
| 106a | surface of AF coating 106 |
| 106b | opposing surface of AF coating 106 |
| 107 | display cover glass |
| 107a | surface of display cover glass 107 |

DETAILED DESCRIPTION

The Si-PSA composition comprises: (A) an alkenyl-functional polyorganosiloxane; (B) a polyorganohydrogensiloxane; (C) a hydrosilylation reaction catalyst; (D) a polyorganosilicate resin; (E) a polyfluoropolyethersilane; (F) an anchorage additive; (G) a hydrosilylation reaction inhibitor; and optionally (H) a solvent.

Starting Material (A) Alkenyl-Functional Polyorganosiloxane

Starting material (A) in the Si-PSA composition is an alkenyl-functional polyorganosiloxane comprising unit formula (A-I): $(R^M_2R^USiO_{1/2})_a(R^M_3SiO_{1/2})_b(R^M_2SiO_{2/2})_c(R^MR^USiO_{2/2})_d(R^MSiO_{3/2})_e(R^USiO_{3/2})_f(SiO_{4/2})_g$, where each $R^M$ is an independently selected alkyl group of 1 to 30 carbon atoms; each $R^U$ is an independently selected alkenyl group of 2 to 30 carbon atoms; and subscripts a, b, c, and d represent average numbers of each unit per molecule. In unit formula (A-I), subscript a≥0, subscript b≥0, subscript c≥0, subscript d≥0, subscript e≥0, subscript f≥0, a quantity (a+d+f)≥2, subscript g≥0, and a quantity (a+b+c+d+e+f+g) is 4 to 10,000.

Each $R^M$ is an independently selected alkyl group of 1 to 30 carbon atoms. Alternatively, each $R^M$ may have 1 to 12 carbon atoms, alternatively 1 to 9 carbon atoms, alternatively 1 to 8 carbon atoms, and alternatively 1 to 6 carbon atoms. "Alkyl" means a cyclic, branched, or unbranched, saturated monovalent hydrocarbon group. Suitable alkyl groups for $R^M$ are exemplified by linear and branched alkyl groups such as methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, and branched alkyl groups of 6 to 30 carbon atoms; or cyclic alkyl groups such as cyclopentyl and cyclohexyl. Alternatively, each $R^M$ may be independently selected from the group consisting of linear alkyl and branched alkyl. Alternatively, each $R^M$ may be linear alkyl. Alternatively, each $R^M$ may be methyl.

In unit formula (A-I), each $R^U$ is an independently selected monovalent alkenyl group of 2 to 30 carbon atoms. Alternatively, each $R^U$ may have 2 to 12 carbon atoms, alternatively 2 to 8 carbon atoms, and alternatively 2 to 6 carbon atoms. "Alkenyl" means a cyclic, branched or unbranched, monovalent hydrocarbon group having one or more carbon-carbon double bonds. Suitable alkenyl groups are exemplified by vinyl; allyl; isopropenyl; and butenyl, pentenyl, hexenyl, and heptenyl, (including branched and linear isomers of 4 to 7 carbon atoms); and cyclohexenyl. Alternatively, each $R^U$ may be linear alkenyl, such as vinyl, allyl, or hexenyl.

Starting material (A) may comprise (A1) an alkenyl-functional polydiorganosiloxane gum, (A2) an alkenyl-functional polydiorganosiloxane polymer, (A3) a Q branched alkenyl-functional polyorganosiloxane polymer, (A4) an alkenyl-functional silsesquioxane polymer, and (A5) a combination of two or more thereof. The alkenyl-functional polydiorganosiloxane gum (A1) may have unit formula (A1-1): $(R^M_2R^USiO_{1/2})_j(R^M_2SiO_{2/2})_k(R^MR^USiO_{2/2})_m(R^M_3SiO_{1/2})_n$, where $R^M$ and $R^U$ are as described above; subscripts j, k, m, and n represent average numbers of each unit per molecule; subscript j is 0, 1, or 2; subscript n is 0, 1, or 2; a quantity (j+n)=2; subscript k≥0; subscript m≥0; a quantity (k+m) is 3,000 to 10,000; and a quantity (j+m)≥2. Alternatively, subscript j may be 2 and subscript n may be 0. Alternatively, the quantity (k+m) may be 4,000 to 8,000, alternatively 4,500 to 7,500, and alternatively 5,000 to 7,000. Alternatively, subscript m may be 0, and subscript k may be 3,000 to 10,000; alternatively 4,000 to 8,000, alternatively 4,500 to 7,500, and alternatively 5,000 to 7,000.

Starting material (A1) the gum is exemplified by i) bis-dimethylvinylsiloxy-terminated polydimethylsiloxane, ii) bis-dimethylvinylsiloxy-terminated poly(dimethylsiloxane/methylvinylsiloxane), iii) bis-dimethylvinylsiloxy-terminated polymethylvinylsiloxane, iv) bis-trimethylsiloxy-terminated poly(dimethylsiloxane/methylvinylsiloxane), v) bis-trimethylsiloxy-terminated polymethylvinylsiloxane, vi) bis-dimethylvinylsiloxy-terminated poly(dimethylsiloxane/methylphenylsiloxane/methylvinylsiloxane), vii) bis-dimethylvinylsiloxy-terminated poly(dimethylsiloxane/methylphenylsiloxane), viii) bis-dimethylvinylsiloxy-terminated poly(dimethylsiloxane/diphenylsiloxane), ix) bis-phenyl,methyl, vinyl-siloxy-terminated polydimethylsiloxane, x) bis-dimethylhexenylsiloxy-terminated polydimethylsiloxane, xi) bis-dimethylhexenylsiloxy-terminated poly(dimethylsiloxane/methylhexenylsiloxane), xii) bis-dimethylhexenylsiloxy-terminated polymethylhexenylsiloxane, xiii) bis-trimethylsiloxy-terminated poly(dimethylsiloxane/methylhexenylsiloxane), xiv) bis-trimethylsiloxy-terminated polymethylhexenylsiloxane, xv) bis-dimethylhexenyl-siloxy terminated poly(dimethylsiloxane/methylphenylsiloxane/methylhexenylsiloxane), xvi) bis-dimethylvinylsiloxy-terminated poly(dimethylsiloxane/methylhexenylsiloxane), xvii) bis-dimethylhexenyl-siloxy-terminated poly(dimethylsiloxane/methylphenylsiloxane), xviii) dimethylhexenyl-siloxy-terminated poly(dimethylsiloxane/diphenylsiloxane), and xix) a combination of two or more of i) to xviii). Alternatively, starting material (A1), the gum, may comprise a bis-alkenyl-terminated polydialkylsiloxane such as x) bis-dimethylvinylsiloxy-terminated polydimethylsiloxane, xi) bis-dimethylhexenylsiloxy-terminated polydimethylsiloxane, or xii) a combination of both x) and xi).

Methods of preparing linear alkenyl-functional polydiorganosiloxane gums described above for starting material (A1), such as hydrolysis and condensation of the corresponding organohalosilanes and oligomers or equilibration of cyclic polydiorganosiloxanes, are known in the art, see for example U.S. Pat. Nos. 3,284,406; 4,772,515; 5,169,920; 5,317,072; and 6,956,087, which disclose preparing linear polydiorganosiloxanes with alkenyl groups.

Starting material (A) may further comprise (A2) an alkenyl-functional polydiorganosiloxane polymer of unit formula $(R^M_2R^USiO_{1/2})_o(R^M_2SiO_{2/2})_p(R^MR^USiO_{2/2})_q(R^M_3SiO_{1/2})_r$, where $R^M$ and $R^U$ are as described above; subscripts o, p, q and r, represent average numbers of each unit per molecule; subscript o is 0, 1, or 2; subscript r is 0, 1, or 2; a quantity (r+o)=2; subscript p≥0; subscript q≥0; a quantity (p+q) is 100 to 1,200; and a quantity (o+q)≥2. Alternatively, subscript o may be 2, and subscript r may be 0. Alternatively, the quantity (p+q) may be 200 to 1,000.

Starting material (A2), the polymer, is exemplified by i) bis-dimethylvinylsiloxy-terminated polydimethylsiloxane, ii) bis-dimethylvinylsiloxy-terminated poly(dimethylsiloxane/methylvinylsiloxane), iii) bis-dimethylvinylsiloxy-terminated polymethylvinylsiloxane, iv) bis-trimethylsiloxy-terminated poly(dimethylsiloxane/methylvinylsiloxane), v) bis-trimethylsiloxy-terminated polymethylvinylsiloxane, vi) bis-dimethylvinylsiloxy-terminated poly(dimethylsiloxane/methylphenylsiloxane/methylvinylsiloxane), vii) bis-dimethylvinylsiloxy-terminated poly(dimethylsiloxane/methylphenylsiloxane), viii) bis-dimethylvinylsiloxy-terminated poly(dimethylsiloxane/diphenylsiloxane), ix) bis-phenyl,methyl, vinyl-siloxy-terminated polydimethylsiloxane, x) bis-dimethylhexenylsiloxy-terminated polydimethylsiloxane, xi) bis-dimethylhexenylsiloxy-terminated poly(dimethylsiloxane/methylhexenylsiloxane), xii) bis-dimethylhexenylsiloxy-terminated polymethylhexenylsiloxane, xiii) bis-trimethylsiloxy-terminated poly(dimethylsiloxane/methylhexenylsiloxane), xiv) bis-trimethylsiloxy-terminated polymethylhexenylsiloxane, xv) bis-dimethylhexenyl-siloxy terminated poly(dimethylsiloxane/methylphenylsiloxane/methylhexenylsiloxane), xvi) bis-dimethylvinylsiloxy-terminated poly(dimethylsiloxane/methylhexenylsiloxane), xvii) bis-dimethylhexenyl-siloxy-terminated poly(dimethylsiloxane/methylphenylsiloxane), xviii) dimethylhexenyl-siloxy-terminated poly(dimethylsiloxane/diphenylsiloxane), and xix) a combination of two or more of i) to xviii).

Methods of preparing linear alkenyl-functional polydiorganosiloxane polymers described above for starting material (A2), such as hydrolysis and condensation of the corresponding organohalosilanes and oligomers or equilibration of cyclic polydiorganosiloxanes, are known in the art, see for example U.S. Pat. Nos. 3,284,406; 4,772,515; 5,169,920; 5,317,072; and 6,956,087, which disclose preparing linear polydiorganosiloxanes with alkenyl groups. Examples of linear polydiorganosiloxanes having alkenyl groups are commercially available from, e.g., Gelest Inc. of Morrisville, Pennsylvania, USA under the tradenames DMS-V00, DMS-V03, DMS-V05, DMS-V21, DMS-V22, DMS-V25, DMS-V-31, DMS-V33, DMS-V34, DMS-V35, DMS-V41, DMS-V42, DMS-V43, DMS-V46, DMS-V51, DMS-V52.

Alternatively, starting material (A) may comprise a branched alkenyl-functional polyorganosiloxane. The branched alkenyl-functional polyorganosiloxane may comprise (A3) a Q branched polyorganosiloxane, (A4) a T branched polyorganosiloxane, or a combination thereof. For example, the Q branched polyorganosiloxane may have unit formula $(R^M_3SiO_{1/2})_u(R^M_2R^USiO_{1/2})_v(R^M_2SiO_{2/2})_s(SiO_{4/2})_t$, where $R^M$ and $R^U$ are as described above; subscripts s, t, u, and v represent average numbers of each unit per molecule and have average values such that 2≥u≥0, 4≥v≥0, 995≥s≥4, t=1, (u+v)=4, and (u+v+s+t) has a value sufficient to impart a viscosity>100 mPa·s measured by rotational viscometry to the branched alkenyl-functional polyorganosiloxane. Alternatively, viscosity may be 170 mPa·s to 1000 mPa·s, alternatively 170 to 500 mPa·s, alternatively 180 mPa·s to 450 mPa·s, and alternatively 190 mPa·s to 420 mPa·s. Viscosity may be measured at 25° C. at 0.1 to 50 RPM on a Brookfield DV-III cone & plate viscometer with #CP-52 spindle, e.g., for polymers (such as certain alkenyl-functional polyorganosiloxanes) with viscosity of 120 mPa·s to 250,000 mPa·s. One skilled in the art would recognize that as viscosity increases, rotation rate decreases and would be able to select appropriate spindle and rotation rate. Suitable branched alkenyl-functional polyorganosiloxanes for starting material (A3) are known in the art and can be made by known methods, exemplified by those disclosed in U.S. Pat. No. 6,806,339 to Cray, et al. and U.S. Patent Publication 2007/0289495 to Cray, et al.

Alternatively, the Q branched alkenyl-functional polyorganosiloxane may comprise formula: $[R^UR^MSi—(O—SiR^M{}_2)_{s'}—O]_{(4-u')}—Si—[O—(R^M{}_2SiO)_{s''}SiR^M{}_3]_{u'}$, where $R^M$ and $R^U$ are as described above; and subscripts v, w, and x have values such that $200 \geq s'' \geq 1$, $2 \geq u' \geq 0$, and $200 \geq s' \geq 1$. Alternatively, in this formula, each $R^M$ is independently selected from the group consisting of methyl and phenyl, and each $R^U$ is independently selected from the group consisting of vinyl, allyl, and hexenyl.

Alternatively, the branched alkenyl-functional polyorganosiloxane for starting material (A) may comprise (A4) a T branched polyorganosiloxane (silsesquioxane polymer) of unit formula: $(R^M{}_3SiO_{1/2})_{ii}(R^UR^M{}_2SiO_{1/2})_{jj}(R^M{}_2SiO_{2/2})_{kk}(R^UR^MSiO_{2/2})_{mm}(R^MSiO_{3/2})_{nn}$, where $R^M$ and $R^U$ are as described above, subscripts ii, jj, kk, mm, and nn represent average numbers of each unit per molecule and have values such that subscript ii≥0, subscript jj≥0, subscript kk is 15 to 995, subscript nn>0, and subscript mm≥0. Subscript ii may be 0 to 10. Alternatively, subscript ii may have a value such that: 12≥ii≥0; alternatively 10≥ii≥0; alternatively 7≥ii≥0; alternatively 5≥ii≥0; and alternatively 3≥ii≥0. Alternatively, subscript jj≥1. Alternatively, subscript jj≥3. Alternatively, subscript jj may have a value such that: 12≥jj>0; alternatively 12≥jj≥3: alternatively 10≥jj>0: alternatively 7≥jj>1: alternatively 5≥jj≥2: and alternatively 7≥jj≥3. Alternatively, subscript kk may have a value such that: 800≥kk≥15: and alternatively 400≥kk≥15. Alternatively, subscript mm may have a value such that: 800≥mm≥0; 800≥mm≥15; and alternatively 400≥mm≥15. Alternatively, subscript mm may b 0. Alternatively, a quantity (kk+mm) may have a value such that 995≥(kk+mm)≥15. Alternatively, subscript nn≥1. Alternatively, subscript nn may be 1 to 10. Alternatively, subscript nn may have a value such that: 10≥nn>0; alternatively 5≥nn>0; and alternatively nn=1. Alternatively, subscript nn may be 1 to 10, alternatively subscript nn may be 1 or 2. Alternatively, when subscript nn=1, then subscript jj may be 3 and subscript kk may be 0. The values for subscript jj may be sufficient to provide the T branched polyorganosiloxane with an alkenyl content of 0.1% to 1%, alternatively 0.2% to 0.6%, based on the weight of the T branched polyorganosiloxane. Suitable T branched polyorganosiloxanes (silsesquioxanes) for starting material (A3) are exemplified by those disclosed in U.S. Pat. No. 4,374,967 to Brown, et al; U.S. Pat. No. 6,001,943 to Enami, et al.; U.S. Pat. No. 8,546,508 to Nabeta, et al.; and U.S. Pat. No. 10,155,852 to Enami.

The amount of starting material (A) in the Si-PSA composition is 30% to 80%, based on combined weights of starting materials (A) to (G) (e.g., based on combined weights of all starting materials in the Si-PSA composition excluding solvent). Alternatively, the amount of starting material (A) in the Si-PSA composition may be 40% to 70%, on the same basis. Alternatively, the amount of (A1) alkenyl-functional polydiorganosiloxane gum may be 0 to 80%, based on combined weights of starting materials (A) to (G); the amount of (A2) alkenyl-functional polydiorganosiloxane polymer may be 0 to 80%, based on combined weights of starting materials (A) to (G); the amount of (A3) alkenyl-functional branched polyorganosiloxane polymer may be 0 to 80%, based on combined weights of starting materials (A) to (G); and the amount of (A4) alkenyl-functional silsesquioxane polymer may be 0 to 80%, based on combined weights of starting materials (A) to (G); with the proviso that one or more of (A1), (A2), (A3), and (A4) is present in an amount of at least 30%, based on combined weights of starting materials (A) to (G).

Starting Material (B) Polyorganohydrogensiloxane

Starting material (B) in the Si-PSA composition is a polyorganohydrogensiloxane that may act as a crosslinker. The polyorganohydrogensiloxane comprises unit formula $(R^M{}_3SiO_{1/2})_{dd}(H_{cc}R^M{}_{(3-cc)}SiO_{1/2})_h(SiO_{4/2})_i(ZO_{1/2})_{ee}$, where $R^M$ is as described above, each Z is independently selected from the group consisting of hydrogen and $R^M$, subscripts dd and h represent relative weights of monofunctional siloxane units in the formula, subscript i represents relative weight of tetrafunctional siloxane units in the formula, and subscript ee represents relative weight of hydrolyzable groups in the formula, and where subscript dd≥0, subscript h>0, subscript i>0, subscript ee≥0, subscripts dd, h, and i have values sufficient to provide the polyorganohydrogensiloxane with a weight ratio of monofunctional units: tetrafunctional units {(dd+h):i} of 0.4:1 to 2:1, and subscript ee has a value sufficient to provide 0 to 2 weight % of hydrolyzable groups based on weight of the polyorganohydrogensiloxane; and subscript cc represents the number of silicon bonded hydrogen atoms in each monofunctional unit, and 2≥cc≥1.

Alternatively, in the unit formula above, each Z may be hydrogen or an alkyl group of 1 to 9 carbon atoms. Alternatively, each Z may be hydrogen or an alkyl group of 1 to 4 carbon atoms. Alternatively each Z may be hydrogen or methyl. Alternatively, each Z may be hydrogen.

Alternatively, the weight ratio of monofunctional units: tetrafunctional units {(dd+h):i} may be 1:1 to 2:1, alternatively 1.8:1 to 1.9:1. Alternatively, when subscript dd=0, then the polyorganohydrogensiloxane may have a weight ratio of monofunctional units: tetrafunctional units (h:i) of be 1:1 to 2:1, alternatively 1.8:1 to 1.9:1

Alternatively, in the formula above, subscript cc may be 1.

Alternatively, (B) the polyorganohydrogensiloxane may comprise unit formula $(HR^M{}_2SiO_{1/2})_h(SiO_{4/2})_i$, where $R^M$ and subscripts h and i are as described above.

Starting material (B) may be one polyorganohydrogensiloxane, or a combination of two or more polyorganohydrogensiloxanes that differ in at least one property such as silicon bonded hydrogen (SiH) content and molecular weight. Polyorganohydrogensiloxanes suitable for starting material (B) are known in the art and may be prepared by known methods, such as that described in U.S. Pat. No. 4,774,310 to Butler.

The amount of polyorganohydrogensiloxane in the Si-PSA composition depends on various factors including the selection and amount of starting material (A), however, the amount of (B) the polyorganohydrogensiloxane may be 0.1% to 5%, based on combined weights of starting materials (A) to (G) (e.g., based on combined weights of all starting materials in the Si-PSA composition excluding solvent). Alternatively, the amount of (B) the polyorganohydrogensiloxane in the Si-PSA composition may be 0.5% to 2.5%, and alternatively 1% to 2%, on the same basis. Alternatively, the amount of (B) the polyorganohydrogensiloxane may be sufficient to provide a ratio of silicon bonded hydrogen atoms: aliphatically unsaturated groups in starting material (A) (i.e., the SiH/Vi ratio) of the Si-PSA composition of 0.5 to 20, alternatively 2 to 7.

Starting Material (C) Hydrosilylation Reaction Catalyst

Hydrosilylation reaction catalysts are known in the art and are commercially available. Hydrosilylation reaction catalysts include platinum group metal catalysts. Such hydrosilylation reaction catalysts can be (C-1) a metal selected from platinum, rhodium, ruthenium, palladium, osmium, and iridium. Alternatively, the hydrosilylation reaction catalyst may be (C-2) a compound of such a metal, for example, chloridotris(triphenylphosphane)rhodium(I) (Wilkinson's Catalyst), a rhodium diphosphine chelate such as [1,2-bis(diphenylphosphino)ethane]dichlorodirhodium or [1,2-bis(diethylphospino)ethane]dichlorodirhodium, chloroplatinic acid (Speier's Catalyst), chloroplatinic acid hexahydrate, platinum dichloride. Alternatively, the hydrosilylation reaction catalyst may be (C-3) a complex of the platinum group metal compound with a low molecular weight organopolysiloxane, or (C-4) the platinum group metal compound microencapsulated in a matrix or coreshell type structure. Complexes of platinum with low molecular weight organopolysiloxanes include 1,3-diethenyl-1,1,3,3-tetramethyldisiloxane complexes with platinum (Karstedt's Catalyst). Alternatively, the hydrosilylation catalyst may comprise (C-5) the complex microencapsulated in a resin matrix. Exemplary hydrosilylation reaction catalysts are described in U.S. Pat. Nos. 3,159,601; 3,220,972; 3,296,291; 3,419,593; 3,516,946; 3,814,730; 3,989,668; 4,784,879; 5,036,117; and 5,175,325; and EP 0 347 895 B. Microencapsulated hydrosilylation reaction catalysts and methods of preparing them are known in the art, as exemplified in U.S. Pat. Nos. 4,766,176 and 5,017,654. Hydrosilylation reaction catalysts are commercially available, for example, SYL-OFF™ 4000 Catalyst and SYL-OFF™ 2700 are available from Dow Silicones Corporation of Midland, Michigan, USA.

The amount of hydrosilylation reaction catalyst used herein will depend on various factors including the selection of starting materials (B) and (A), and their respective contents of silicon bonded hydrogen atoms (SiH) and aliphatically unsaturated groups and the content of the platinum group metal in the catalyst selected, however, the amount of hydrosilylation reaction catalyst is sufficient to catalyze hydrosilylation reaction of SiH and aliphatically unsaturated groups, alternatively the amount of catalyst is sufficient to provide 1 ppm to 6,000 ppm of the platinum group metal based on combined weights of starting materials containing silicon bonded hydrogen atoms and aliphatically unsaturated hydrocarbon groups; alternatively 1 ppm to 5,200 ppm, alternatively 1 ppm to 1,000 ppm, alternatively 1 ppm to 300 ppm, and alternatively 1 ppm to 100 ppm, on the same basis. Alternatively, the amount of catalyst may be 0.01% to 5% based on combined weights of starting materials (A) to (G), (e.g., based on combined weights of all starting materials in the Si-PSA composition, excluding solvent). Alternatively, when the hydrosilylation reaction catalyst comprises a platinum-organosiloxane complex, the amount of catalyst may be 0.1% to 5%, alternatively 1% to 5%, and alternatively 2% to 4%, based on combined weights of starting materials (A) to (G) (e.g., based on combined weights of all starting materials in the Si-PSA composition excluding solvent).

Starting Material (D) Polyorganosilicate Resin

Starting material (D) in the Si-PSA composition described herein is a polyorganosilicate resin. The polyorganosilicate resin comprises monofunctional units of formula $R^P_3SiO_{1/2}$ and tetrafunctional silicate units ("Q" units) of formula $SiO_{4/2}$, where $R^P$ is selected from the group consisting of $R^M$ and $R^U$, each of which are described above. Alternatively, in the polyorganosilicate resin, each $R^P$ may be $R^M$, alternatively each $R^P$ may be alkyl, and alternatively methyl. Alternatively, each $R^P$ may be selected from linear alkyl and linear alkenyl, alternatively methyl and vinyl. Alternatively, at least one-third, alternatively at least two thirds of the $R^P$ groups are methyl groups. Alternatively, the monofunctional units may be exemplified by $(Me_3SiO_{1/2})$ and $(Me_2ViSiO_{1/2})$. The polyorganosilicate resin is soluble in solvents such as those described below, exemplified by liquid hydrocarbons, such as benzene, toluene, xylene, and heptane, or in liquid organosilicon compounds such as low viscosity linear and cyclic polydiorganosiloxanes.

When prepared, the polyorganosilicate resin comprises the monofunctional units and the Q units described above, and the polyorganosiloxane further comprises units with silicon bonded hydroxyl groups and may comprise neopentamer of formula $Si(OSiR^P_3)_4$, where $R^P$ is as described above, e.g., the neopentamer may be tetrakis(trimethylsiloxy)silane. $^{29}Si$ NMR spectroscopy may be used to measure hydroxyl content and molar ratio of monofunctional and Q units, where said ratio is expressed as {M(resin)}/{Q(resin)}, excluding monofunctional and Q units from the neopentamer (M:Q ratio). M:Q ratio represents the molar ratio of the total number of triorganosiloxy groups (monofunctional units) of the resinous portion of the polyorganosilicate resin to the total number of silicate groups (Q units) in the resinous portion. M:Q ratio may be 0.5:1 to 1.5:1.

The Mn of the polyorganosilicate resin depends on various factors including the types of hydrocarbon groups represented by $R^P$ that are present. The Mn of the polyorganosilicate resin refers to the number average molecular weight measured using GPC, when the peak representing the neopentamer is excluded from the measurement. The Mn of the polyorganosilicate resin may be ≥500 g/mol, alternatively 1,000 g/mol to 10,000 g/mol, and alternatively 3,000 g/mol to 8,000 g/mol. Alternatively, Mn of the polyorganosilicate resin may be 3,500 g/mol to 8,000 g/mol, alternatively 4,000 g/mol to 5,000 g/mol.

U.S. Pat. No. 8,580,073 at col. 3, line 5 to col. 4, line 31, and U.S. Patent Publication 2016/0376482 at paragraphs [0023] to [0026] are hereby incorporated by reference for disclosing polyorganosilicate (MQ) resins, which are suitable polyorganosilicate resins for use in the Si-PSA composition described herein. The polyorganosilicate resin can be prepared by any suitable method, such as cohydrolysis of the corresponding silanes or by silica hydrosol capping methods. The polyorganosilicate resin may be prepared by silica hydrosol capping processes such as those disclosed in U.S. Pat. No. 2,676,182 to Daudt, et al.; U.S. Pat. No. 4,611,042 to Rivers-Farrell et al.; and U.S. Pat. No. 4,774,310 to Butler, et al. The method of Daudt, et al. described above involves reacting a silica hydrosol under acidic conditions with a hydrolyzable triorganosilane such as trimethylchlorosilane, a siloxane such as hexamethyldisiloxane, or mixtures thereof, and recovering a copolymer having M units and Q units. The resulting copolymers generally contain from 2 to 5 percent by weight of hydroxyl groups.

The intermediates used to prepare the polyorganosilicate resin may be triorganosilanes and silanes with four hydrolyzable substituents or alkali metal silicates. The triorganosilanes may have formula $R^P_3SiX^1$, where $R^P$ is as described above and $X^1$ represents a hydrolyzable substituent such as halogen, alkoxy, acyloxy, hydroxyl, oximo, or ketoximo;

alternatively, halogen, alkoxy or hydroxyl. Silanes with four hydrolyzable substituents may have formula $SiX^2_4$, where each $X^2$ is halogen, alkoxy or hydroxyl. Suitable alkali metal silicates include sodium silicate.

The polyorganosilicate resin prepared as described above typically contains silicon bonded hydroxyl groups, e.g., of formulae, $HOSiO_{3/2}$ and/or $HOR^P_2SiO_{1/2}$. The polyorganosilicate resin may comprise up to 2% of silicon bonded hydroxyl groups, as measured by FTIR spectroscopy. For certain applications, it may be desirable for the amount of silicon bonded hydroxyl groups to be below 0.7%, alternatively below 0.3%, alternatively less than 1%, and alternatively 0.3% to 0.8%. Silicon bonded hydroxyl groups formed during preparation of the polyorganosilicate resin can be converted to trihydrocarbon siloxane groups or to a different hydrolyzable group by reacting the silicone resin with a silane, disiloxane, or disilazane containing the appropriate terminal group. Silanes containing hydrolyzable groups may be added in molar excess of the quantity required to react with the silicon bonded hydroxyl groups on the polyorganosilicate resin.

Alternatively, the polyorganosilicate resin may further comprise 2% or less, alternatively 0.7% or less, and alternatively 0.3% or less, and alternatively 0.3% to 0.8% of units represented by formula $XSiO_{3/2}$ and/or $XR^P_2SiO_{1/2}$ where $R^P$ is as described above, and X represents a hydrolyzable substituent, as described above for $X^1$.

Alternatively, the polyorganosilicate resin may have terminal aliphatically unsaturated groups. The polyorganosilicate resin having terminal aliphatically unsaturated groups may be prepared by reacting the product of Daudt, et al. with an unsaturated organic group-containing endblocking agent and an endblocking agent free of aliphatic unsaturation, in an amount sufficient to provide from 3 to 30 mole percent of unsaturated organic groups in the final product. Examples of endblocking agents include, but are not limited to, silazanes, siloxanes, and silanes. Suitable endblocking agents are known in the art and exemplified in U.S. Pat. Nos. 4,584, 355; 4,591,622; and 4,585,836. A single endblocking agent or a mixture of such agents may be used to prepare such resin.

Alternatively, the polyorganosilicate resin may comprise unit formula (D-1-1): $(R^M_3SiO_{1/2})_w(R^M_2R^USiO_{1/2})_x(SiO_{4/2})_y(ZO_{1/2})_z$, where $R^M$, $R^U$, and Z are as described above; subscripts w, x, and y represent mole fractions of each unit in the formula and have values such that w>0; x≥0; y>1; (w+x)>4; with the proviso that a quantity (w+x+y) has a value sufficient to provide the polyorganosilicate resin with a number average molecular weight as described above; and subscript z is 0 to a value sufficient to give (D) the polyorganosilicate resin a hydrolyzable group content of up to 4%, alternatively up to 2%, based on weight of the polyorganosilicate resin. Alternatively, subscript x may be 0. Alternatively, (w+y) may have the value sufficient to provide the polyorganosilicate resin with the number average molecular weight as described above The exact amount of polyorganosilicate resin depends on various factors including the types and amounts of other starting materials in the Si-PSA composition, the concentration of aliphatically unsaturated groups and silicon bonded hydrogen atoms of the other starting materials in the Si-PSA composition, and whether an inhibitor is present. However, starting materials (A) and (D) may be present in amounts sufficient to provide a weight ratio of amount of starting material (D) to starting material (A) (Resin/Polymer), or (D)/(A) ratio) of 0.2 to 0.7, alternatively 0.3 to 0.6. Alternatively, the polyorganosilicate resin may be present in an amount of 10% to 50%, alternatively 20% to 40%, based on combined weights of starting materials (A) to (G) in the Si-PSA composition (e.g., based on combined weights of all starting materials in the Si-PSA composition excluding solvent).

Starting Material (E)

The Si-PSA composition further comprises starting material (E), a polyfluoropolyether silane. The polyfluoropolyether silane may have general formula (E1): $Y-Z_a-[(OC_3F_6)_b-(OCF(CF_3)CF_2)_c-(OCF_2CF(CF_3))_d-(OC_2F_4)_e-(CF(CF_3))_f-(OCF_2)_g]-(CH_2)_h-X-(C_nH_{2n}-((SiR_2-O)_m-SiR_2)_i-(C_jH_{2j})-Si-(X')_{3-z}(R^1)_z$, where the groups represented by subscripts b to g, i.e., the groups within the square brackets in formula (E1), may be present in any order within the polyfluoropolyether silane, including a different order as that which is represented in the general formula above and throughout this description. Moreover, these groups may be present in randomized or block form. In addition, the group represented by subscript b is typically linear, i.e., the group represented by subscript b may alternatively be written as $(O-CF_2-CF_2-CF_2)_b$.

In general formula (E1), Z is independently selected from $-(CF_2)-$, $-(CF(CF_3)CF_2O)-$, $-(CF_2CF(CF_3)O)-$, $-(CF(CF_3)O)-$, $-(CF(CF_3)-CF_2)-$, $-(CF_2-CF(CF_3))-$, and $-(CF(CF_3))-$. Alternatively, Z and the moiety represented by $-[(OC_3F_6)_b-(OCF(CF_3)CF_2)_c-(OCF_2CF(CF_3))_d-(OC_2F_4)_e-(CF(CF_3))_f-(OCF_2)_g]-$ may be selected such that Z and this moiety do not form a peroxide. Z is typically selected such that the polyfluoropolyether silane does not include an oxygen-oxygen (O—O) bond within the backbone.

In general formula (E1), subscript a is an integer from 1 to 200; subscripts b, c, d, e, f, and g are integers each independently selected from 0 to 200; subscripts h, n, and j are integers each independently selected from 0 to 20, i and m are integers each independently selected from 0 to 5. Subscript z is an integer independently selected from 0 to 2. Alternatively, when subscript i=0, then subscript j=0. Alternatively, when subscript i is an integer greater than 0, subscript j is also an integer greater than 0. The groups represented by subscripts n and j (i.e., groups of unit formulas $(C_nH_{2n})$ and $(C_jH_{2j})$ may also be independently linear or branched. For example, when n (or j) is 3, then these groups may be independently selected from $-CH_2-CH_2-CH_2-$, $-CH(CH_3)-CH_2-$, or $-CH_2-CH(CH_3)-$, wherein the latter two structures have pendent alkyl groups, i.e., these structures are branched and not linear.

In general formula (E1), X is a bivalent organic group or an oxygen atom. Alternatively, X may be an oxygen atom.

In general formula (E1), R is a hydrocarbon group having from 1 to 22 carbon atoms, optionally substituted with a heteroatom. Alternatively, each R is an unsubstituted hydrocarbon group having from 1 to 22 carbon atoms.

In general formula (E1), X' is an independently selected hydrolysable group. The hydrolysable group may be a halide group, an alkoxy group, an alkylamino group, a carboxy group, an alkyliminoxy group, an alkenyloxy group, or an N-alkylamido group.

In general formula (E1), R' is an independently selected hydrocarbon group having from 1 to 22 carbon atoms which is free of aliphatic unsaturation.

In general formula (E1), Y is selected from F and Si—$(X')_{3-z}(R^1)_z(C_jH_{2j})-((SiR_2-O)_m-SiR_2)-(C_nH_{2n})-X-(CH_2)_h-$; wherein X', z, $R^1$, j, m, i, n and h are as defined above. Alternatively, when Y is F; Z is —$CF_2$—; a is an integer from 1 to 3; and subscripts c, d, f, and i are 0. Alternatively, the fluoropolyether silane may have formula: F—$(CF_2)_a$—$(OC_3F_6)_b$—$(OC_2F_4)$—$(OCF_2)_g$—F, where a, b, and g are as described above.

Examples of polyfluoropolyether silanes include heptafluoropropoxy (poly(perfluoroPO))tetrafluoropropyloxypropyltrimethoxysilane; propane, 2-(ethoxydifluoromethyl)-1,1,1,2,3,3,3-heptafluoro; butane, 1-ethoxy-1,1,2,2,3,3,4,4-nonafluoro; and combinations of two or more thereof. Polyfluoropolyether silanes are known in the art and can be made by known methods, see for example, U.S. Pat. No. 9,045,647 to Kleyer et al., which is hereby incorporated by reference.

The amount of polyfluoropolyether silane in the Si-PSA composition depends on various factors including the type and amount of other starting materials in the composition and the fluorine content of the polyfluoropolyether silane, however, the amount of polyfluoropolyether silane in the Si-PSA composition may be >0.4% to 20%, alternatively >0.49% to 20%, alternatively >0.90% to 20%, alternatively 0.97% to 20%, alternatively 0.49% to 15.00%, alternatively 0.49% to 2.85%, alternatively 0.97% to 15.00%, and alternatively 0.97% to 10%, and alternatively 0.97% to 2.85%; based on combined weights of starting materials (A) to (G) in the Si-PSA composition (e.g., based on combined weights of all starting materials in the Si-PSA composition excluding solvent). Alternatively, the amount of polyfluoropolyether silane in the Si-PSA composition may be at least 0.49%, alternatively at least 0.97%, alternatively at least 1.02%, alternatively at least 1.9%, and alternatively up to 1.92%; while at the same time the amount may be up to 20%, alternatively up to 10%, alternatively up to 5%, alternatively up to 3%, alternatively up to 2.85%, on the same basis.

Starting Material (F) Anchorage Additive

Starting material (F) is an anchorage additive that may facilitate bonding to a substrate by a Si-PSA prepared by curing the Si-PSA composition described herein. However, the presence of the anchorage additive will not detrimentally affect the desired peel adhesion, thereby allowing the Si-PSA to be removed from an anti-fingerprint hard coating in a screen protective film without damaging the coating or leaving significant residue.

Suitable anchorage additives include silane coupling agents such as methyltrimethoxysilane, vinyltrimethoxysilane, allyltrimethoxysilane, 3-methacryloxypropyltrimethoxysilane, 3-aminopropyltrimethoxysilane, N-(2-aminoethyl)-3-aminopropyltrimethoxysilane, bis(trimethoxysilyl)propane, and bis(trimethoxysilylhexane; and mixtures or reaction mixtures of said silane coupling agents. Alternatively, the anchorage additive may be tetramethoxysilane, tetraethoxysilane, dimethyldimethoxysilane, methylphenyldimethoxysilane, methylphenyldiethoxysilane, phenyltrimethoxysilane, methyltrimethoxysilane, methyltriethoxysilane, vinyltriethoxysilane, allyltriethoxysilane, 3-glycidoxypropyltrimethoxysilane, 3-glycidoxypropyltriethoxysilane, or 3-methacryloxypropyl trimethoxysilane.

Alternatively, the anchorage additive may be exemplified by a reaction product of a vinyl alkoxysilane and an epoxy-functional alkoxysilane; a reaction product of a vinyl acetoxysilane and epoxy-functional alkoxysilane; and a combination (e.g., physical blend and/or reaction product) of a polyorganosiloxane having at least one aliphatically unsaturated hydrocarbon group and at least one hydrolyzable group per molecule and an epoxy-functional alkoxysilane (e.g., a combination of a hydroxy-terminated, vinyl functional polydimethylsiloxane with glycidoxypropyltrimethoxysilane). Suitable anchorage additives and methods for their preparation are disclosed, for example, in U.S. Pat. No. 9,562,149 and the references cited therein, U.S. Patent Application Publication Number 2012/0328863 at paragraph [0091], and U.S. Patent Publication 2017/0233612 at paragraph [0041].

Anchorage additives are commercially available. For example, SYL-OFF™ 297, SYL-OFF™ 397, and SYL-OFF™ SL 9250 Anchorage Additive are available from Dow Silicones Corporation of Midland, Michigan, USA. Other exemplary anchorage additives include (F-1) vinyltriacetoxysilane, (F-2) glycidoxypropyltrimethoxysilane, (F-3) a combination of (F-1) and (F-2), and (F-4) a combination of (F-3) and a polydimethylsiloxane terminated with hydroxyl groups, methoxy groups, or terminated with both a hydroxy group and a methoxy group. The combinations (F-3) and (F-4) may be physical blends and/or reaction products.

The amount of anchorage additive depends on various factors including the type of substrate to which the Si-PSA composition will be applied and whether a primer or other surface treatment will be used before application of the Si-PSA composition. However, the amount of anchorage additive may be 0.01 to 5%, alternatively 0.1% to 5%, alternatively 0.5% to 3%, and alternatively 0.9% to 1%, based on the combined weights of starting materials (A) to (G) in the Si-PSA composition (e.g., based on combined weights of all starting materials in the Si-PSA composition excluding solvent).

Starting Material (G) Hydrosilylation Reaction Inhibitor

Starting material (G) is a hydrosilylation reaction inhibitor (inhibitor) that may be used for altering rate of reaction of the silicon bonded hydrogen atoms and the aliphatically unsaturated hydrocarbon groups of other starting materials in the Si-PSA composition, as compared to reaction rate of the same starting materials but with the inhibitor omitted. Inhibitors are exemplified by acetylenic alcohols such as a dimethyl hexynol, e.g., 3,5-dimethyl-1-hexyn-3-ol; 1-butyn-3-ol; 1-propyn-3-ol; a methyl butynol, e.g., 2-methyl-3-butyn-2-ol and/or 3-methyl-1-butyn-3-ol; 3-methyl-1-pentyn-3-ol; 3-phenyl-1-butyn-3-ol; 4-ethyl-1-octyn-3-ol; 3,5-dimethyl-1-hexyn-3-ol; and an ethynyl cyclohexanol, e.g., 1-ethynyl-1-cyclohexanol; and a combination thereof; cycloalkenylsiloxanes such as methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination thereof; ene-yne compounds such as 3-methyl-3-penten-1-yne, 3,5-dimethyl-3-hexen-1-yne, and a combination thereof; triazoles such as benzotriazole; phosphines; mercaptans; hydrazines; amines, such as tetramethyl ethylenediamine, 3-dimethylamino-1-propyne, n-methylpropargylamine, propargylamine, and 1-ethynylcyclohexylamine; fumarates, e.g., dialkyl fumarates such as diethyl fumarate, and/or dialkenyl fumarates such as diallyl fumarate, dialkoxyalkyl fumarates; maleates e.g., dialkenyl maleates such as diallyl maleate and/or alkyl maleates such as diethyl maleate or n-propyl maleate; and a combination thereof.

Alternatively, the inhibitor may be a silylated acetylenic compound. Without wishing to be bound by theory, it is thought that adding a silylated acetylenic compound reduces yellowing of the reaction product prepared from hydrosilylation reaction as compared to a reaction product from hydrosilylation of starting materials that do not include a silylated acetylenic compound or that include an organic acetylenic alcohol inhibitor, such as those described above.

The silylated acetylenic compound is exemplified by (3-methyl-1-butyn-3-oxy)trimethylsilane, ((1,1-dimethyl-2-propynyl)oxy)trimethylsilane, bis(3-methyl-1-butyn-3-oxy)dimethylsilane, bis(3-methyl-1-butyn-3-oxy)silanemethylvinylsilane, bis((1,1-dimethyl-2-propynyl)oxy)dimethylsilane, methyl(tris(1,1-dimethyl-2-propynyloxy))silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)trimethylsilane, (3-phenyl-1-butyn-3-oxy)diphenylmethylsilane, (3-phenyl-1-butyn-3-oxy)dimethylphenylsilane, (3-phenyl-1-butyn-3-oxy)dimethylvinylsilane, (3-phenyl-1-butyn-3-oxy)dimethylhexenylsilane, (cyclohexyl-1-ethyn-1-oxy)dimethylhexenylsilane, (cyclohexyl-1-ethyn-1-oxy)dimethylvinylsilane, (cyclohexyl-1-ethyn-1-oxy)diphenylmethylsilane, (cyclohexyl-1-ethyn-1-oxy)trimethylsilane, and combinations thereof. Alternatively, the silylated acetylenic compound is exemplified by methyl(tris(1,1-dimethyl-2-propynyloxy))silane, ((1,1-dimethyl-2-propynyl)oxy)trimethylsilane, or a combination thereof. The silylated acetylenic compound useful as the inhibitor herein may be prepared by methods known in the art, for example, U.S. Pat. No. 6,677,407 to Bilgrien et al. discloses silylating an acetylenic alcohol described above by reacting it with a chlorosilane in the presence of an acid receptor.

The amount of inhibitor added herein will depend on various factors including the desired reaction rate, the particular inhibitor used, and the selection and amount of starting materials (A) and (B). However, the amount of inhibitor may be 0.01% to 5%, alternatively 0.05% to 2%, alternatively 0.1% to 1%, alternatively 0.12% to 0.5%, and alternatively 0.12% to 0.25%, based on the combined weights of starting materials (A) to (G) in the Si-PSA composition (e.g., based on combined weights of all starting materials in the Si-PSA composition excluding solvent).

Starting Material (H) Solvent

The Si-PSA composition may optionally further comprise starting material (H), a solvent. The solvent may be an organic solvent such as a hydrocarbon, a ketone, an ester acetate, an ether, and/or a cyclic siloxane having an average degree of polymerization from 3 to 10. Suitable hydrocarbons for the solvent can be (H-1) an aromatic hydrocarbon such as benzene, ethyl benzene, toluene, or xylene; (H-2) an aliphatic hydrocarbon such as hexane, heptane, octane, or iso-paraffin; or (H-3) a combination thereof. Alternatively, the solvent may be a glycol ether such as propylene glycol methyl ether, dipropylene glycol methyl ether, propylene glycol n-butyl ether. Suitable ketones include acetone, methyl ethyl ketone, or methyl isobutyl ketone. Suitable ester acetates include ethyl acetate or isobutyl acetate. Suitable ethers include diisopropyl ether or 1,4-dioxane. Suitable cyclic siloxanes having a degree of polymerization from 3 to 10, alternatively 3 to 6, include hexamethylcyclotrisiloxane, octamethylcyclotetrasiloxane, and/or decamethylcyclopentasiloxane. Alternatively, the solvent may be selected from the group consisting of toluene, xylene, heptane, ethyl benzene, ethyl acetate, and a combination of two or more thereof.

The amount of solvent will depend on various factors including the type of solvent selected and the amount and type of other starting materials selected for the Si-PSA composition. However, the amount of solvent may range from 0% to 90%, alternatively 0% to 80%, alternatively 20 to 70%, alternatively 0 to 70%, and alternatively 20% to 65%, based on combined weights of all starting materials in the Si-PSA composition. The solvent can be added during preparation of the Si-PSA composition, for example, to aid mixing and delivery. All or a portion of the solvent may be added with one of the other starting materials. For example, the polyorganosilicate resin, the branched polyorganohydrogensiloxane, and/or the catalyst, may be dissolved in a solvent before combination with the other starting materials in the Si-PSA composition. All or a portion of the solvent may optionally be removed after the Si-PSA composition is prepared.

Method of Making the Si-PSA Composition

The Si-PSA composition can be prepared by a method comprising combining all starting materials as described above by any convenient means such as mixing at ambient or elevated temperature. The hydrosilylation reaction inhibitor may be added before the hydrosilylation reaction catalyst, for example, when the Si-PSA composition will be prepared at elevated temperature and/or the Si-PSA composition will be prepared as a one part composition.

The method may further comprise delivering one or more starting materials in a solvent (e.g., the hydrosilylation reaction catalyst, the polyorganosilicate resin, and/or the polyorganohydrogensiloxane) may be dissolved in a solvent when combined with one or more of the other starting materials in the Si-PSA composition. One skilled in the art would understand that if it is desired that the resulting Si-PSA composition will be solventless (i.e., will contain no solvent or may contain trace amounts of residual solvent from delivery of a starting material, however, a solvent e.g., organic solvent such as toluene or non-functional polydiorganosiloxane), then solvent may be removed after mixing two or more of the starting materials, and in this embodiment solvent is not intentionally added to the Si-PSA composition.

Alternatively, the Si-PSA composition may be prepared as a multiple part composition, for example, when the Si-PSA composition will be stored for a long period of time before use, e.g., up to 6 hours before coating the Si-PSA composition on a substrate. In the multiple part composition, the hydrosilylation reaction catalyst is stored in a separate part from any starting material having a silicon bonded hydrogen atom, for example the polyorganohydrogensiloxane, and the parts are combined shortly before use of the Si-PSA composition.

For example, a multiple part composition may be prepared by combining starting materials comprising at least some of (A) the alkenyl-functional polyorganosiloxane, (B) the polyorganohydrogensiloxane, and optionally one or more other additional starting materials described above to form a base part, by any convenient means such as mixing. A curing agent may be prepared by combining starting materials comprising at least some of (A) the alkenyl-functional polyorganosiloxane, (C) the hydrosilylation reaction catalyst, and optionally one or more other additional starting materials described above by any convenient means such as mixing. The starting materials may be combined at ambient or elevated temperature. The hydrosilylation reaction inhibitor may be included in one or more of the base part, the curing agent part, or a separate additional part. The anchorage additive may be added to the base part, or may be added as a separate additional part. The polyorganosilicate resin may be added to the base part, the curing agent part, or a separate additional part. The polyorganosilicate resin may be added to the base part. The solvent may be added to the base part. Alternatively, starting materials comprising the polyorganosilicate resin, and some or all of the solvent, may be added in a separate additional part. When a two part composition is used, the weight ratio of amounts of base part to curing agent part may range from 1:1 to 10:1. The Si-PSA composition will cure via hydrosilylation reaction to form a Si-PSA.

The method described above may further comprise one or more additional steps. The Si-PSA composition prepared as described above may be used to form an adhesive article, e.g., a Si-PSA (prepared by curing the Si-PSA composition described above) on a substrate. The method may, therefore, further comprise comprises applying the Si-PSA composition to a substrate.

Applying the Si-PSA composition to the substrate can be performed by any convenient means. For example, the Si-PSA composition may be applied onto a substrate by slot die coater, gravure coater, comma coater, offset coater, offset-gravure coater, roller coater, reverse-roller coater, air-knife coater, or curtain coater.

The substrate can be any material that can withstand the curing conditions (described below) used to cure the pressure sensitive adhesive composition to form the pressure sensitive adhesive on the substrate. For example, any substrate that can withstand heat treatment at a temperature equal to or greater than 120° C., alternatively 150° C. is suitable. Examples of materials suitable for such substrates including polymeric films such as polyimide (PI), polyetheretherketone (PEEK), polyethylene naphthalate (PEN), liquid-crystal polyarylate, polyamideimide (PAI), polyether sulfide (PES), polyethylene terephthalate (PET), polycarbonate (PC), thermoplastic polyurethane (TPU), polyethylene (PE), or polypropylene (PP). Alternatively, the substrate may be glass. The thickness of the substrate is not critical, however, the thickness may be 5 μm to 300 μm, alternatively 50 μm to 250 μm, and alternatively 50 μm. Alternatively, the substrate may be selected from the group consisting of PET, TPU, PC, and glass. Alternatively, the substrate may be a polymeric substrate, such as PET.

To improve bonding of the Si-PSA to the substrate, the method for forming the adhesive article may optionally further comprise treating the substrate before applying the Si-PSA composition. Treating the substrate may be performed by any convenient means, such as applying a primer, or subjecting the substrate to corona-discharge treatment, etching, or plasma treatment before applying the Si-PSA composition to the substrate.

An adhesive article such as a film or tape may be prepared by applying the Si-PSA composition described above onto the substrate described above. When the Si-PSA composition contains a solvent, the method may further comprise removing the all, or a portion, of the solvent before and/or during curing. Removing solvent may be performed by any convenient means, such as heating at a temperature that vaporizes the solvent without fully curing the Si-PSA composition, e.g., heating at a temperature of 70° C. to 120° C., alternatively 50° C. to 100° C., and alternatively 70° C. to 80° C. for a time sufficient to remove all or a portion of the solvent (e.g., 30 seconds to 1 hour, alternatively 1 minute to 5 minutes).

Curing the Si-PSA composition may be performed by heating at a temperature of 80° C. to 200° C. alternatively 90° C. to 180° C., alternatively 100° C. to 160° C., and alternatively 110° C. to 150° C. for a time sufficient to cure the Si-PSA composition (e.g., for 30 seconds to an hour, alternatively 1 to 5 minutes). If cure speed needs to be increased or the process oven temperatures lowered, the catalyst level can be increased. This forms a pressure sensitive adhesive on the substrate. Curing may be performed by placing the substrate in an oven. The amount of the Si-PSA composition to be applied to the substrate depends on the specific application, however, the amount may be sufficient such that after curing thickness of the pressure sensitive adhesive may be 5 μm to 100 μm, and for protective film the thickness may be 5 μm to 50 μm, alternatively 7 μm to 40 μm, and alternatively 10 μm to 40 μm.

The method described herein may optionally further comprise applying a removable release liner to the Si-PSA opposite the substrate, e.g., to protect the Si-PSA before use of the adhesive article. The release liner may be applied before, during or after curing the Si-PSA composition; alternatively after curing. The adhesive article may be a protective film for use in on an anti-fingerprint hard coating in a screen protective film of a display device.

Use in a Protective Film

FIG. 1 shows a partial cross section of a protective film (100) overlying a surface (106a) of an anti-fingerprint coating (106) overlying a surface (107a) of a display cover glass (107) such that the opposing surface (106b) of the anti-fingerprint coating (106) contacts the surface (107a) of the cover glass (107). The protective film (100) includes screen protective film (100a) including a Si-PSA (105) having a surface (105a) and an opposing surface (105b). The opposing surface (105b) of the Si-PSA (105) adheres to the surface (106a) of the AF coating (106) with a peel adhesion of >30 g/in, as measured according to Reference Example 3, below. The Si-PSA (105) may have a thickness of 15 μm to 40 μm. The Si-PSA (105) is carried on a substrate (104) having a surface (104a) and an opposing surface (104b). The surface (105a) of the Si-PSA (105) contacts the opposing surface (104b) of the substrate (104). The substrate (104) may be selected from the group consisting of PET, TPU, PC, and glass and may have a thickness of 50 μm to 250 μm.

The screen protective film (100a) further comprises an anti-fingerprint hard coating (103) having a surface (103a) and an opposing surface (103b) overlying the substrate (104) such that the opposing surface (103b) of the anti-fingerprint hard coating (103) contacts the surface (104a) of the substrate (104).

The protective film (100) further comprises a topside protective film (100b), which comprises a topside Si-PSA (102) having a surface (102a) and an opposing surface (102b) and a polymeric substrate (101) having a surface (101b). The topside Si-PSA (102) is coated on the polymeric substrate (101) such that the surface (102a) of the topside Si-PSA (102) contacts the surface (101b) of the polymeric substrate (101). The opposing surface (102b) of the topside Si-PSA (102) contacts the surface (103a) of the anti-fingerprint hard coating (103). The topside Si-PSA (102) may have a thickness of 10 µm, and the polymeric substrate (101) may have a thickness of 50 µm. The second substrate (101) may be PET.

The Si-PSA composition and method described above may be used in fabrication of the topside protective film (100b). The Si-PSA composition described herein may be applied to the surface (101b) of the polymeric substrate (101) and cured to form the topside Si-PSA (102), using the method for making the adhesive article described above. Without wishing to be bound by theory, it is thought that the topside Si-PSA prepared by curing the Si-PSA composition described above may have a dynamic coefficient of friction <0.500, alternatively <0.300, when tested as described below in Reference Example 2.

EXAMPLES

These examples are intended to illustrate the invention to one skilled in the art and are not to be interpreted as limiting the scope of the invention set forth in the claims. The materials in Table 1 were used in these examples.

TABLE 1

Starting Materials

| Starting Material | Description | Source |
| --- | --- | --- |
| 5-7104 H (solids) Resin 1 | Capped polymethylsilicate resin with Mn = 4,700 g/mol and hydroxyl content = 0-2% | DSC |
| SGM 826 Gum 1 | Bis-dimethylvinylsiloxy-terminated poly-dimethylsiloxane of unit formula $M^{Vi}_2D_{4091}$ | DSC |
| SGM 11 Gum 2 | Bis-dimethylvinylsiloxy-terminated poly(di-methyl/methylvinyl)siloxane of unit formula $M^{Vi}_2D_{7084}D^{Vi}_{11.3}$ | DSC |
| SFD 117 Polymer 1 | Bis-dimethylvinylsiloxy-terminated poly-dimethylsiloxane with Mn 22,000 g/mol of unit formula $M^{Vi}_2D_{290}$ | SILASTIC ™ SFD-117 |
| SCV 128 Polymer 2 | Bis-dimethylvinylsiloxy-terminated poly-dimethylsiloxane of unit formula $M^{Vi}_2D_{969}$ | DSC |

TABLE 1-continued

Starting Materials

| Starting Material | Description | Source |
| --- | --- | --- |
| 2-7751 Polymer 3 | Vi terminal, Branched polyorganosiloxane of unit formula $M^{Vi}_4D_{227}Q$ | DSC |
| SCV 120 Polymer 4 | Bis-dimethylvinylsiloxy-terminated poly-dimethylsiloxane of unit formula $M^{Vi}_2D_{495.8}$ | DSC |
| SFD 120 Polymer 5 | Bis-dimethylvinylsiloxy-terminated poly-dimethylsiloxane of unit formula $M^{Vi}_2D_{493}$ | DSC |
| 2634 Coating Additive 1 | 14% of Heptafluoropropoxy (poly(perfluoro-PO))tetrafluoropropyloxypropyltrimethoxy-silane, 40% of Propane, 2-(ethoxydifluoro-methyl)-1,1,1,2,3,3,3-heptafluoro 40% of Butane, 1-ethoxy-1,1,2,2,3,3,4,4-nonafluoro | DSC |
| Anchorage Additive | Mixture containing glycidoxypropyltrimeth-oxysilane and methanol | SYL-OFF ™ SL 9250 Anchorage additive |
| RMS 777 Cross-linker 4 | Polymethylhydrogensiloxane of unit formula $M^H_{1.82}Q$, where 1.82 indicates that the polymethylhydrogen siloxane has a weight ratio of $M^H$:Q units of 1.82:1, and where the polymethylhydrogensiloxane has SiH content = 0.963% | DOWSIL ™ RMS-777 |
| Solvent | Toluene, xylene, ethyl benzene, heptane mixture | Commercially available from various sources |
| ETCH | 1-ethynyl-1-cyclohexanol | commercially available from various sources |
| Catalyst | Karstedt's Catalyst | SYL-OFF ™ 4000 catalyst |

In Table 1, "DSC" means Dow Silicones Corporation of Midland, Michigan, USA. Starting materials branded DOWSIL™, and SILASTIC™, and SYL-OFF™ are commercially available from DSC.

In this Reference Example 1, silicone pressure sensitive adhesive compositions were prepared by mixing the starting materials in the order and in the amounts shown below in Table 2 at RT.

TABLE 2

Silicone Pressure Sensitive Adhesive Compositions

| Starting material | Comparative 1 | Comparative 2 | Working 1 | Working 2 | Working 3 | Working 4 |
| --- | --- | --- | --- | --- | --- | --- |
| Resin 1 | 29.25 | 29.25 | 29.25 | 29.25 | 29.25 | 29.25 |
| SGM 826 | 6.75 | 6.75 | 6.75 | 6.75 | 6.75 | 6.75 |
| SGM 11 | 12.00 | 12.00 | 12.00 | 12.00 | 12.00 | 12.00 |
| SFD 117 | 5.25 | 5.25 | 5.25 | 5.25 | 5.25 | 5.25 |
| SCV 128 | 16.25 | 16.25 | 16.25 | 16.25 | 16.25 | 16.25 |
| 2-7751 | 4.38 | 4.38 | 4.38 | 4.38 | 4.38 | 4.38 |
| SCV 120 | 2.75 | 2.75 | 2.75 | 2.75 | 2.75 | 2.75 |
| SFD 120 | 1.59 | 1.59 | 1.59 | 1.59 | 1.59 | 1.59 |
| RMS 777 | 1.33 | 1.33 | 1.33 | 1.33 | 1.33 | 1.33 |
| 9250 | 0.78 | 0.78 | 0.8 | 1.6 | 2.4 | 0.78 |
| 2634 Coating | 0 | 0.2 | 0.78 | 0.78 | 0.78 | 0.4 |
| Solvent Introduced with Resin 1 | 8.25 | 8.25 | 8.25 | 8.25 | 8.25 | 8.25 |
| Extra solvent | 113.39 | 113.39 | 133.39 | 133.39 | 133.39 | 113.39 |
| ETCH | 0.21 | 0.21 | 0.11 | 0.11 | 0.11 | 0.21 |
| Pt 4000 | 1.46 | 1.46 | 1.46 | 1.46 | 1.46 | 1.46 |

In this Reference Example 2, the silicone pressure sensitive adhesive compositions from Table 2 were coated on optical PET substrate with a thickness of 50 um. Thickness of each silicone pressure sensitive adhesive composition was controlled to produce a silicone pressure sensitive adhesive with a thickness of 10±5 um after cure of the silicone pressure sensitive adhesive compositions from Table 2. The silicone pressure sensitive adhesive compositions were cured in an oven at 150° C. for 2 minutes.

The resulting topside protective films were laminated on a screen protective film for 1 hour at RT. The topside protective film was then removed, and dynamic coefficient of friction of the screen protective film was measured according to ISO 8295-1995 with a minor change in specimen preparation, as follows. The sled and felt were wrapped with weighting paper whose product ID is 92410710S with size 75*75 mm manufactured by Sinopharm Chemical Reagent Co. Ltd before testing. Results are shown below in Table 3.

In this Reference Example 3, Adhesion Testing was performed as follows: Each topside protective film sample prepared as described above was tested for adhesion to PET and to PET with a hard coating (to model performance of the topside protective film on a hard coating of a screen protective film) by peeling the tape from the substrate, and checking if there was any Si-PSA transferred onto the anti-fingerprint hard coating from the PET film. An Adhesion/Release Tester AR-1500 was used for this test. The width of each PET sheet was 1 inch. Peel speed and angle were 0.3 m/min and 180°, respectively. The unit was grams/Inch. Results are shown below in Table 3.

TABLE 3

| Results | | | | | | |
|---|---|---|---|---|---|---|
| | CE1 | CE2 | WE1 | WE2 | WE3 | WE4 |
| Dynamic coefficient of friction of AF hard coating on substrate at RT | 0.809 | 0.558 | 0.199 | 0.103 | 0.089 | 0.387 |

In Tables 2 and 3, above, "CE" means comparative example. "WE" means working example, and "N.A." means not assessed.

Problem to be Addressed

Conventional silicone pressure sensitive adhesives lack the combination of properties desired for topside protective films used to protect anti-fingerprint hard coatings in screen protective films for AF cover glass used in display devices, such as sufficient adhesion to anti-fingerprint hard coatings with low dynamic coefficient of friction.

Electronic device fabricators are seeking a new topside protective film. The peel adhesion and dynamic coefficient of friction should be low on anti-fingerprint hard coatings.

INDUSTRIAL APPLICABILITY

The working examples above showed that Si-PSA compositions that cure to form Si-PSAs with dynamic coefficient of friction <0.500 were prepared. The working examples W4, WE1, WE2, and WE3 had dynamic coefficient of friction of 0.387, 0.199, 0.103, and 0.089, respectively. This showed that increasing the amount of polyfluoropolyether silane in the range claimed herein reduced dynamic coefficient of friction of the Si-PSA to <0.500 at RT. Each of the Working Examples had adhesion to PET and to an AF hard coating that was suitable for use in a topside protective film.

The topside protective film including the Si-PSA prepared by curing the Si-PSA composition described herein may find use in fabrication and/or shipping of various display devices such as mobile telephones, mobile television receivers, wireless devices, smartphones, personal data assistants, wireless electronic mail receivers, hand-held or portable computers, netbooks, notebooks, smartbooks, tablets, global positioning system receivers/navigators, cameras, digital media players, camcorders, game consoles, and electronic reading devices. The topside protective film comprising the Si-PSA on a surface of a substrate may be used on anti-fingerprint hard coatings used in screen protective films for cover glass for the display devices described above.

Definitions and Usage of Terms

All amounts, ratios, and percentages herein are by weight, unless otherwise indicated. The amounts of all starting materials in a composition total 100% by weight. The SUMMARY and ABSTRACT are hereby incorporated by reference. The articles 'a', 'an', and 'the' each refer to one or more, unless otherwise indicated by the context of specification. The singular includes the plural unless otherwise indicated. The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an alkenyl group, or an aryl group, includes the member alkyl individually; the subgroup alkyl and aryl; and any other individual member and subgroup subsumed therein. The abbreviations used herein have the definitions in Table 5.

TABLE 5

| Abbreviations | |
|---|---|
| Abbreviation | Definition |
| AF | anti-fingerprint |
| D | a difunctional siloxane unit of formula $(CH_3)_2SiO_{2/2}$ |
| $D^H$ | a difunctional siloxane unit of formula $(H)(CH_3)SiO_{2/2}$ |
| $D^{Vi}$ | a difunctional siloxane unit of formula $(CH_3\!\!=\!\!CH_2(CH_3)SiO_{2/2}$ |
| DP | degree of polymerization |
| FTIR | Fourier Transform Infra Red: The concentration of silanol groups present in the polyorganosilicate resin may be determined using FTIR spectroscopy according to ASTM Standard E-168-16. |
| g | grams |
| g/in | grams per inch |

TABLE 5-continued

Abbreviations

| Abbreviation | Definition |
|---|---|
| g/mol | grams per mol |
| GPC | gel permeation chromatography |
| kg | kilogram |
| m | meters |
| M | a monofunctional siloxane unit of formula $(CH_3)_3SiO_{1/2}$ |
| $M^H$ | a monofunctional siloxane unit of formula $(H)(CH_3)_2SiO_{1/2}$ |
| $M^{Vi}$ | a monofunctional siloxane unit of formula $(CH_3=CH_2)(CH_3)_2SiO_{1/2}$ |
| Me | methyl |
| min | minutes |
| mm | millimeters |
| Mn | number average molecular weight measured by GPC as disclosed in U.S. Pat. No. 9,593,209, Reference Example 1 at col. 31 |
| mPa · s | megaPascal seconds |
| NMR | Nuclear Magnetic Resonance: the 29 Si NMR technique described in U.S. Pat. No. 9,509,209, Reference Example 2 at col. 32 can be used to measure molar ratios of M to Q siloxy units in the polyorganosilicate resin. |
| PET | polyethylene terephthalate |
| Ph | phenyl |
| PSA | pressure sensitive adhesive, including but not limited to acrylic, rubber, and/or silicone pressure sensitive adhesives |
| Q | a tetrafunctional siloxane unit of formula $SiO_{4/2}$ |
| RT | room temperature of 23° C. ± 2° C. |
| Si-PSA | silicone pressure sensitive adhesive |
| SUS | stainless steel |
| μm | micrometers |
| Vi | vinyl |

The invention has been described in an illustrative manner, and it is to be understood that the terminology which has been used is intended to be in the nature of words of description rather than of limitation. With respect to any Markush groups relied upon herein for describing particular features or aspects, different, special, and/or unexpected results may be obtained from each member of the respective Markush group independent from all other Markush members. Each member of a Markush group may be relied upon individually and or in combination and provides adequate support for specific embodiments within the scope of the appended claims.

What is claimed is:

1. A silicone pressure sensitive adhesive composition comprising:

30 weight % to less than 80 weight %, based on combined weights of starting materials (A) to (G), of (A) an alkenyl-functional polydiorganosiloxane comprising unit formula:

$(R^M_2R^USiO_{1/2})_a(R^M_3SiO_{1/2})_b(R^M_2SiO_{2/2})_c(R^MR^USiO_{2/2})_d(R^MSiO_{3/2})_e(R^USiO_{3/2})_f(SiO_{4/2})_g$, where each $R^M$ is an independently selected alkyl group of 1 to 30 carbon atoms;

each $R^U$ is an independently selected alkenyl group of 2 to 30 carbon atoms; and subscripts a, b, c, and d represent average numbers of each unit per molecule, subscript a≥0,
subscript b≥0,
subscript c≥0,
subscript d≥0,
subscript e≥0,
subscript f≥0, a quantity (a+d+f)≥2,
subscript g≥0, and
a quantity (a+b+c+d+e+f+g) is 4 to 10,000;

0.5 weight % to 5 weight %, based on combined weights of starting materials (A) to (G), of (B) a polyorganohydrogensiloxane comprising unit formula $(R^M_3SiO_{1/2})_{dd}(H_{cc}R^M_{(3-cc)}SiO_{1/2})_h(SiO_{4/2})_i(ZO_{1/2})_{ee}$, where $R^M$ is as described above, each Z is independently selected from the group consisting of hydrogen and $R^M$ subscripts dd and h represent relative weights of monofunctional siloxane units in the formula, subscript i represents relative weight of tetrafunctional siloxane units in the formula, subscript dd≥0,
subscript h>0,
subscript i>0, subscripts dd, h, and i have values sufficient to provide the polyorganohydrogensiloxane with a weight ratio of monofunctional units: tetrafunctional units {(dd+h):i} of 0.4:1 to 2:1, subscript ee represents relative weight of hydrolyzable groups in the formula, subscript ee≥0, subscript ee has a value sufficient to provide 0 to 2 weight % of hydrolyzable groups based on weight of the polyorganohydrogensiloxane;

subscript cc represents the number of silicon bonded hydrogen atoms in each monofunctional unit, 2≥cc≥1; and where the starting material (B) is present in a sufficient amount to provide a molar ratio of silicon bonded hydrogen atoms to alkenyl groups in the starting material (A) (SiH:Vi ratio) of 0.5 to 20;

a sufficient amount of (C) a platinum group metal hydrosilylation reaction catalyst to provide 1 ppm to 5,200 ppm of the platinum group metal, based on combined weights of starting materials (A) to (G);

10 to 50 weight %, based on combined weights of the starting materials (A) to (G), of (D) a polyorganosilicate resin;

>0.4 weight % to 20 weight %, based on combined weights of the starting materials (A) to (G), of (E) a polyfluoropolyether silane;

0.01 weight % to 5 weight %, based on combined weights of the starting materials (A) to (G), of (F) an anchorage additive;

0.01 weight % to 5 weight %, based on combined weights of the starting materials (A) to (G), of (G) a hydrosilylation reaction catalyst inhibitor; and 0 to 90 weight %, based on combined weights of all starting materials in the composition, of (H) a solvent.

2. The composition of claim 1, where (A) the alkenyl-functional polydiorganosiloxane is selected from the group consisting of:

(A1) an alkenyl-functional polydiorganosiloxane gum of unit formula $(R^M_2R^USiO_{1/2})_j(R^M_2SiO_{2/2})_k(R^MR^USiO_{2/2})_m(R^M_3SiO_{1/2})_n$, where each $R^M$ is an independently selected alkyl group of 1 to 30 carbon atoms; each $R^U$ is an independently selected alkenyl group of 2 to 30 carbon atoms are as described above;

subscripts j, k, m, and n represent average numbers of each unit per molecule;

subscript j is 0, 1, or 2;
subscript n is 0, 1, or 2;
a quantity (j+n)=2;
subscript k≥0;
subscript m≥0;
a quantity (k+m) is 3,000 to 10,000; and
a quantity (j+m)≥2;
(A2) an alkenyl-functional polydiorganosiloxane polymer of unit formula $(R^M_2R^USiO_{1/2})_o d(R^M_2SiO_{2/2})_p (R^MR^USiO_{2/2})_q (R^M_3SiO_{1/2})_r$, where $R^M$ and $R^U$ are as described above;
subscripts o, p, q and r, represent average numbers of each unit per molecule;
subscript o is 0, 1, or 2;
subscript r is 0, 1, or 2;
a quantity (r+o)=2;
subscript p≥0;
subscript q≥0;
a quantity (p+q) is 100 to 1,200; and
a quantity (o+q)≥2;
(A3) a branched alkenyl-functional polyorganosiloxane of unit formula $(R^M_3SiO_{1/2})_u (R^M_2R^USiO_{1/2})_v (R^M_2SiO_{2/2})_s (SiO_{4/2})_t$, where $R^M$ and $R^U$ are as described above;
subscripts s, t, u, and v represent average numbers of each unit per molecule;
2≥u≥0;
4≥v≥0;
995≥s≥4;
t=1;
(u+v)=4; and
(u+v+s+t) has a value sufficient to impart a viscosity >100 mPa·s measured at room temperature by rotational viscometry to the branched alkenyl-functional polyorganosiloxane;
(A4) an alkenyl-functional silsesquioxane polymer of unit formula $(R^M_3SiO_{1/2})_{ii} (R^UR^M_2SiO_{1/2})_{jj} (R^M_2SiO_{2/2})_{kk} (R^UR^M\text{-}SiO_{2/2})_{mm} (R^M_2SiO_{3/2})_{nn}$, where $R^M$ and $R^U$ are as described above;
Subscripts ii, jj, kk, mm, and nn represent average numbers of each unit per molecule;
subscript 12≥ ii≥0,
subscript 12≥ jj>0,
subscript 995≥ kk≥15,
subscript 10≥ nn>0, and
subscript 800≥ mm≥0; and
(A5) a combination of two or more of (A1), (A2), (A3), and (A4).

3. The composition of claim 1, where starting material (B), the polyorganohydrogensiloxane, comprises unit formula $(HR^M_2SiO_{1/2})_h (SiO_{4/2})_i$, where
$R^M$ is as described above; and
a weight ratio (h:i) is 1:1 to 2:1.

4. The composition of claim 1, where starting material (C), the hydrosilylation reaction catalyst, comprises a platinum-organosiloxane complex.

5. The composition of claim 1, where starting material (D) the polyorganosilicate resin, comprises unit formula: $(R^M_3SiO_{1/2})_w (R^M_2R^USiO_{1/2})_x (SiO_{4/2})_y (ZO_{1/2})_z$, where
each $R^M$ is an independently selected alkyl group of 1 to 30 carbon atoms; each $R^U$ is an independently selected alkenyl group of 2 to 30 carbon atoms; each Z is independently selected from the group consisting of hydrogen and the $R^M$;
subscripts w, x, and y represent mole fractions of each unit in the formula, and have values such that
w>0;
x≥0;
y>1;
with the proviso that a quantity (w+x+y) has a value sufficient to provide the polyorganosilicate resin with a number average molecular weight of 1,000 g/mol to 10,000 g/mol; and
subscript z is 0 to a value sufficient to give (D) the polyorganosilicate resin a hydrolyzable group content of up 4 weight % based on weight of the polyorganosilicate resin.

6. The composition of claim 1, where starting material (E), the polyfluoropolyether silane has general formula (E1):
Y—$Z_a$—[$(OC_3F_6)_b$—$(OCF(CF_3)CF_2)_c$—$(OCF_2CF(CF_3))_d$—$(OC_2F_4)_e$—$(CF(CF_3))_f$—$(OCF_2)_g$]—$(CH_2)_h$—X—$(C_nH_{2n}$—$((SiR_2$—$O)_m$—$SiR_2)_i$—$(C_jH_{2j})$—Si—$(X')_{3-z}(R^1)_z$, where
the groups represented by subscripts b to g in the general formula (E1) are present in any order within the polyfluoropolyether silane, including a different order as that which is represented in the general formula (E1);
each Z is independently selected from the group consisting of —$(CF_2)$—, —$(CF(CF_3)$ $CF_2O)$—, $(CF_2CF(CF_3)O)$—, —$(CF(CF_3)O)$—, —$(CF(CF_3)$—$CF_2)$—, —$(CF_2$—$CF(CF_3))$—, and —$(CF(CF_3))$—,
with the proviso that Z and the moiety represented by —[$(OC_3F_6)_b$—$(OCF(CF_3)CF_2)_c$—$(OCF_2CF(CF_3))_d$—$(OC_2F_4)_e$—$(CF(CF_3))_f$—$(OCF_2)_g$]— are selected such that Z and this moiety do not form a peroxide;
subscript a is an integer from 1 to 200;
subscripts b, c, d, e, f, and g are integers each independently selected from 0 to 200;
subscripts h, n, and j are integers each independently selected from 0 to 20,
subscripts i and m are integers each independently selected from 0 to 5;
subscript z is an integer independently selected from 0 to 2;
X is a bivalent organic group or an oxygen atom;
each R is an independently selected hydrocarbon group having from 1 to 22 carbon atoms, optionally substituted with a heteroatom;
each X' is an independently selected hydrolysable group;
each $R^1$ is an independently selected hydrocarbon group having from 1 to 22 carbon atoms which is free of aliphatic unsaturation;
Y is selected from the group consisting of F and Si—$(X')_{3-z}$ $(R^1)_z(C_jH_{2j})$—$((SiR_2$—$O)_m$—$SiR_2)$—$(C_nH_{2n})$—X—$(CH_2)_h$—; wherein X', z, $R^1$, j, m, i, n and h are as defined above.

7. The composition of claim 1, where each $R^M$ is methyl and each $R^U$ is independently selected from the group consisting of vinyl, allyl, and hexenyl.

8. The composition of claim 1, where starting material (F), the anchorage additive, is selected from the group consisting of (F-1) vinyltriacetoxysilane, (F-2) glycidoxypropyltrimethoxysilane, (F-3) a combination of (F-1) and (F-2), and (F-4) a combination of (F-3) and a polydimethylsiloxane terminated with hydroxyl groups, methoxy groups, or terminated with both a hydroxy group and a methoxy group.

9. The composition of claim 1, where starting material (G), the hydrosilylation reaction inhibitor, is selected from the group consisting of 1-ethynyl-1-cyclohexanol, methyl butynol, and diallyl maleate.

10. The composition of claim 1, where starting material (H), the solvent, is present and is selected from the group consisting of toluene, xylene, heptane, ethyl benzene, ethyl acetate, and a combination of two or more thereof.

11. A silicone pressure sensitive adhesive prepared by curing the composition of claim 1.

12. A protective film comprising:
1) the silicone pressure sensitive adhesive of claim 11,
2) A substrate having a surface, where the silicone pressure sensitive adhesive is coated on the surface of the substrate.

13. A method comprising:
optionally 1) treating a surface of a substrate,
2) Coating the silicone pressure sensitive adhesive composition of claim 1 on the surface of the substrate,
optionally 3) removing some or all of the solvent, when present, and
4) Curing the pressure sensitive adhesive composition, thereby preparing a topside protective film comprising a silicone pressure sensitive adhesive having a first surface adhered to the surface of the substrate, the silicone pressure sensitive adhesive having a second surface opposite the first surface.

14. The method of claim 13, further comprising:
5) Applying the second surface of the silicone pressure sensitive adhesive to an anti-fingerprint hard coating in a display device.

15. The method of claim 14, further comprising:
6) Removing the silicone pressure sensitive adhesive from the anti-fingerprint hard coating in a display device with a dynamic coefficient of friction <0.5.

* * * * *